United States Patent [19]

Kleiss

[11] 4,025,763

[45] May 24, 1977

[54] PROCESS CONTROL INCLUDING SIMULATING A DERIVATIVE

[75] Inventor: Louis D. Kleiss, Borger, Tex.

[73] Assignee: Phillips Petroleum Company, Bartlesville, Okla.

[22] Filed: Oct. 6, 1975

[21] Appl. No.: 620,081

[52] U.S. Cl. .............................. 235/150.1; 318/610; 318/636

[51] Int. Cl.² .......................................... G05B 6/02

[58] Field of Search .......... 318/636, 610; 325/38 B; 235/150.1; 328/135

[56] References Cited

UNITED STATES PATENTS

| | | | |
|---|---|---|---|
| 3,071,727 | 1/1963 | Kitsopoulos | 325/38 B X |
| 3,594,557 | 7/1971 | Anderson | 235/151.1 |

*Primary Examiner*—Eugene G. Botz

[57] ABSTRACT

Control of a process in response to a process signal which is incrementally altered at periodic intervals is accomplished by performing a simulated differentiation of the process signal prior to use of the process signal as an input to a process controller.

23 Claims, 4 Drawing Figures

PROCESS CONTROL INCLUDING SIMULATING A DERIVATIVE

This invention relates to control of a process. In another aspect the invention relates to a method and apparatus for controlling a process. In still another aspect the invention relates to a method and apparatus for simulating the derivative of a signal which is incrementally altered at preselected intervals. In yet another aspect the invention relates to a process control method and apparatus including a method and means for producing a simulated derivative signal in response to a process signal which is incrementally altered at preselected intervals.

The derivative of a time based function can be generally defined as a quantity proportional to the rate of change of the function. The advantages of derivative action in process controllers is well known. The main purpose of rate or derivative action is to speed up the response or control action of a control loop or system. This is accomplished by anticipating where a process is going and applying correction to stop the change in error. The "anticipation" feature of derivative control is accomplished by measuring the change of error between the set point and measurement signal and applying control action proportional to the rate of change or derivative of the error signal. In a typical application, a signal generated in response to a process measurement such as temperature or flow, for example, can be used by a controller incorporating a derivative control action to exercise control over the process in response to the measured process parameter. Some measurement devices, however, produce a signal which is incrementally altered at periodic intervals rather than a continuously variable signal. An automatic process chromatographic analyzer, for example, performs periodic analysis of a process sample stream. The analyzer and equipment associated therewith produce a signal representing the result of one measurement until a successive measurement is completed, then the output signal abruptly changes to reflect the later measurement. When such a periodic measuring device is used with a typical conventional controller incorporating derivative control action, the abrupt measurement change produces a spike in the controller output. During the analysis cycle the analyzer output does not change so that the derivative of the signal during this time is zero. The derivative output of such a conventional controller when used with a periodic measuring device therefore consists of a series of spikes. These spikes may be partially smoothed, using a resistor-capacitor circuit, but the time lag thus introduced will nullify much of the advantage of the derivative action.

Accordingly it is an object of the invention to provide control of a process. Another object of the invention is to provide a method and apparatus for controlling a process. Yet another object of the invention is to provide a method and apparatus for producing a simulated derivative of a signal which is incrementally altered at preselected intervals. Yet another object of the invention is to provide a process control method and apparatus including a method and means for producing a simulated derivative signal in response to a process signal which is incrementally altered at preselected intervals.

In accordance with the invention a method and apparatus are provided whereby the derivative of a periodic output from a measuring device is automatically determined or simulated on a periodic basis rather than on an instantaneous basis. When used in conjunction with a conventional proportional controller, for example, the method and apparatus of the invention can be used to impart a derivative action to a process control system utilizing a periodic measurement input without imparting unwanted spikes or peaks to the control signal. In a preferred method and apparatus of the invention, a signal representative of the value of the process measurement signal during the present periodic interval and a signal representative of the value of the process measurement signal during the immediately preceding interval are used to generate a signal which is responsive to the magnitude and direction of the difference between the present and immediately preceding signals and which is, therefore, capable of providing a simulated derivative of the process signal.

Other objects and advantages of the invention will be apparent from the specification and claims and from the drawings in which FIG. 1 is a schematic block diagram of a conventional control system.

Figure 1:
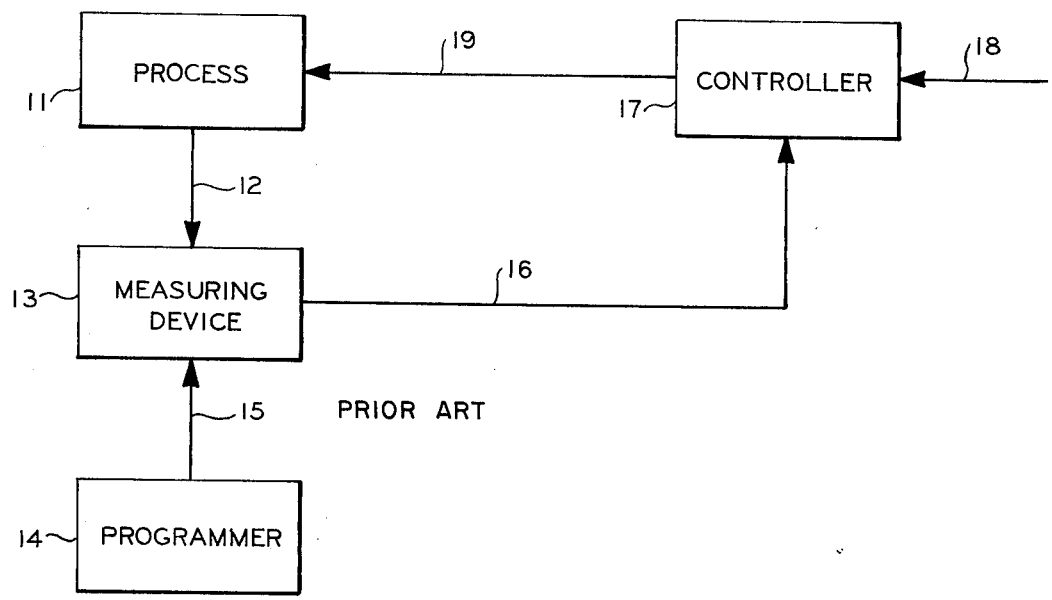

Referring now to FIG. 1 there is illustrated a process 11 which can be any process susceptible to automatic control. Information from the process in the form of a line of process information communication 12 is provided to a suitable measuring device 13. The line of process information communicaton 12 can be any suitable means for establishing communication between the measuring device 13 and the process 11 including providing a flow of process material to the measuring device 13, providing thermal communication between the measuring device 13 and a portion of the process 11, or providing other similar means of communicaton available in the art, or a combination of two or more such lines of communication.

In the case of a measuring device 13 which performs a measuring function at preselected timed intervals, a programmer 14 can be utilized to exercise control over the timing and operation of the measuring device 13 by means of a programming signal 15. A process measurement signal 16 is produced by the measuring device 13 in response to the conditions and information transmitted to the measuring device 13 by the lines of process information communication 12. A conventional process controller 17 compares the measurement signal 16 with a set point signal 18 and, in response to the comparison produces a process control signal 19 suitable for exercising the desired control over the process 11. The characteristics of the controller 17 are ordinarily such that the relationship between the process control signal 19 and the difference between the measurement signal 16 and set point signal 18 is proportional, integral, derivative, or a combination of proportional, integral, and/or derivative.

Figure 2:
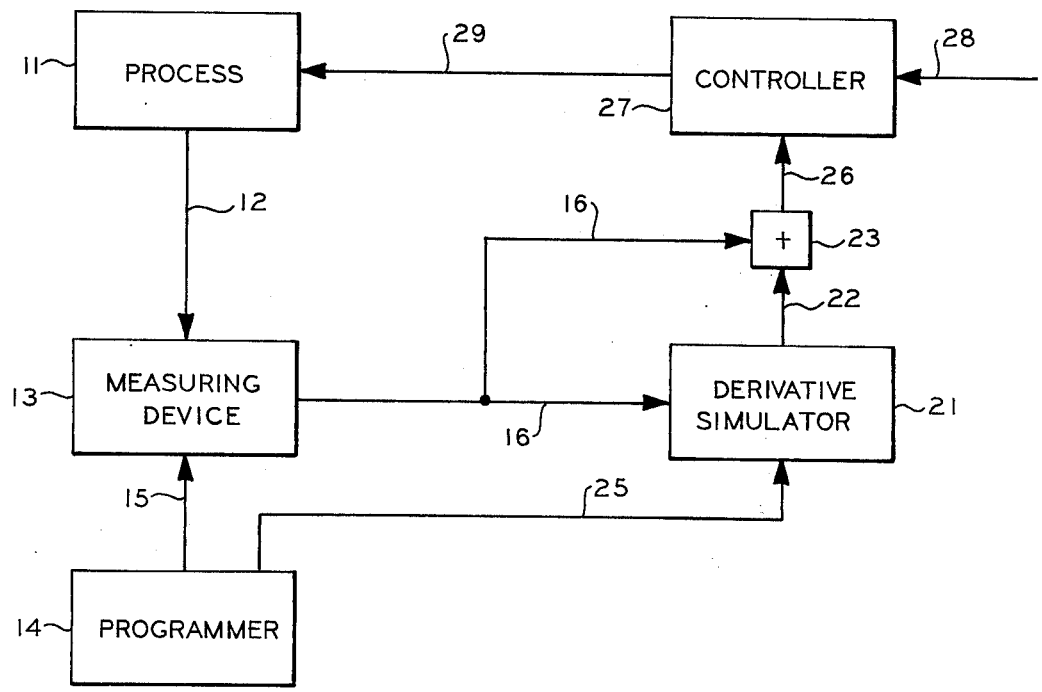
FIG. 2 is a schematic block diagram of a control system built in accordance with one embodiment of the invention.

FIG. 2 is illustrative of control of a process 11 in accordance with the invention. As with the control system of FIG. 1, the lines of process information communication 12 provided to a measuring device 13 contain information from which the measuring device 13 is capable of generating a process measurement signal 16. A programmer 14 controls the cyclic operation of the measuring device 13 by means of a programming signal 15. A derivative simulator means 21 is adapted to accept a measurement signal 16 which is incrementally altered at periodic intervals and produce in response thereto a simulated derivative signal 22. Coordination of the action of the derivative simulator 21 with the measuring device 13 is accomplished by providing an actuation signal 25 which is coordinated with the programming signal 15. In the preferred embodiment illustrated both the programming signal 15 to the measuring device 13 and the actuation signal 25 to the derivative simulator 21 are produced in a desired timed sequence by the programmer 14. Where the function of the programmer 14 is incorporated into the measuring device 13 as an integral portion thereof, the actuation signal 25 to the derivative simulator can originate from the timing mechanism of the measuring device 13.

An adder 23 adds the derivative signal 22 to the measurement signal 16 to produce a controller input signal 26. A controller 27 produces, in response to a comparison of the controller input signal 26 and a set point signal 28, an error signal from which a process control signal 29 suitable for control of the process 11 is generated. Although the controller input signal 26 produced by the adder 23 will be incrementally altered at periodic intervals in the same manner as the process measurement signal 16, the required derivative action will already have been included in the control input signal 26 by addition of the derivative signal 22 from the derivative simulator 21 and a proportional, integral, or proportional-integral controller can be utilized as the controller 27. The amount of derivative control incorporated in the system can be altered by adapting the adder 23 to accord different weights to the process measurement signal 16 and the derivative signal 22 in producing the controller input signal 26.

Figure 3:
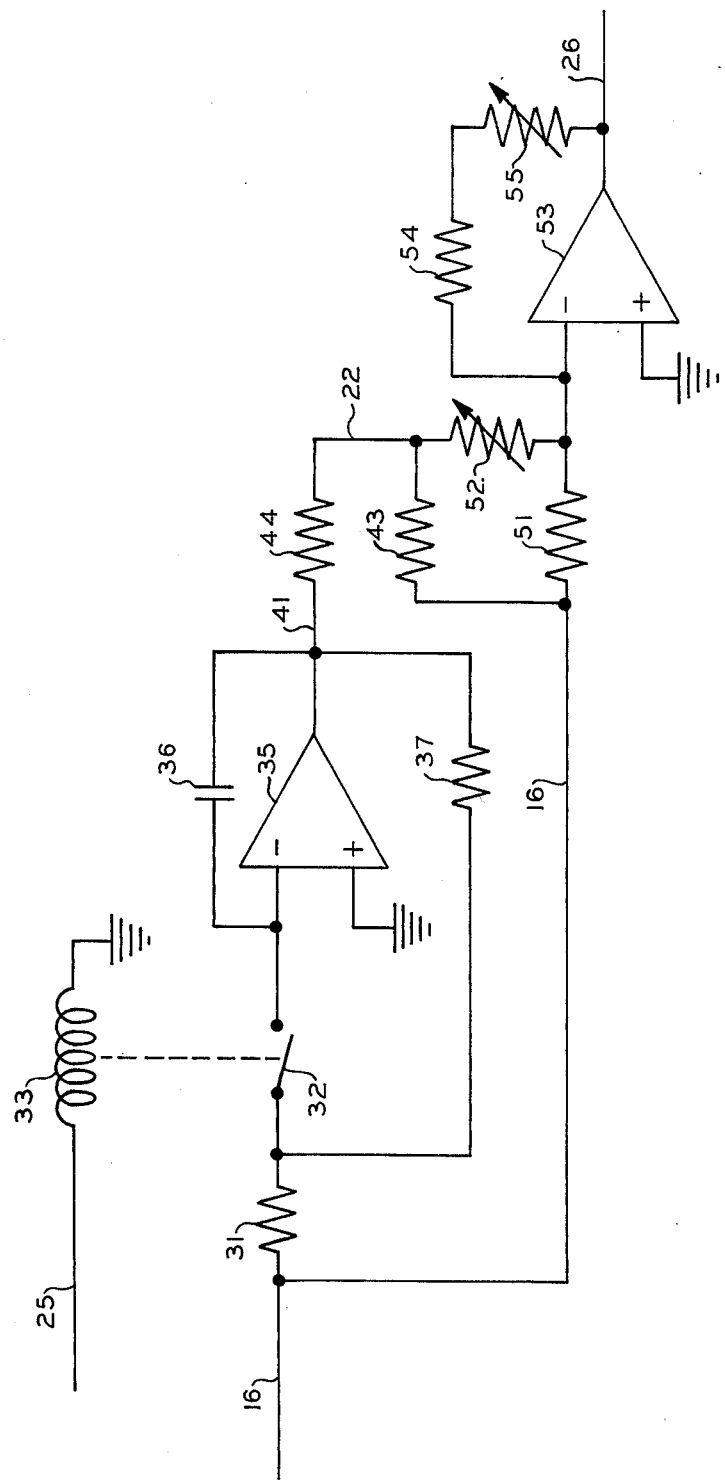
FIG. 3 is a schematic electrical diagram of a preferred circuit incorporating a derivative simulator in accordance with the invention.

Although the preferred embodiment of the invention illustrated by FIG. 3 is an electrical analog circuit, the invention as illustrated by FIG. 3 is an electrical analog circuit, the invention as illustrated by FIG. 2 can be implemented using any suitable apparatus including, for example, digital electronic, pneumatic, hydraulic, mechanical or other simular means including various combinations of two or more such means which are, or can be adapted to be, compatible in the formation of a complete system. The controller 27 could, for example, be an analog electrical instrument, a pneumatic controller, a programmed digital computer, or any other controller suitable for accepting a properly transduced input signal 26 and a compatible set point signal 28 and delivering the desired control signal 29.

A preferred electrical analog circuit for producing a controller input signal 26 in response to a process measurement signal 16 and an actuation signal 25 is illustrated by FIG. 3. In the circuit of FIG. 3, the process measurement signal 16 is applied through a resistor 31 to a switch means 32. During the presence of a suitable actuating signal 25 to a switch actuating means 33, the switch 32 is closed to connect the inverting input of an operational amplifier 35 to the process measurement signal 16 through the resistor 31. The noninverting input of the operational amplifier 35 is grounded. The output of the operational amplifier 35 is connected through a capacitor 36 to the inverting input of the amplifier 35 and is connected through a resistor 37 to the point at which the resistor 31 is connected to the switch means 32. Any suitable switch means 32 can be used including mechanical and solid state electronic switches designed for rapid and accurate signal transmission. The amplifier 35 must have an input impedance high enough to permit an output value to be maintained without significantly altering the charge of the capacitor 36 during the time that the switch means 32 is in its open position. Use of the operational amplifier 35 and switch means 32 in this configuration provides a circuit which is capable of sampling the process measurement signal 16 during momentary closure of the switch means 32, then maintaining the inverted sampled value as the output of the operational amplifier 35 when the switch means 32 is reopened. Timing of the actuating signal 25 by the programmer 14 so that the switch means 32 is momentarily closed shortly before the new value for the process measurement 16 is delivered by the measuring device 13 will result in the value of the process measurement signal 16 immediately before each incremental change thereof being inverted and transferred to the output of the operational amplifier 35 as an output signal 41. When the resistors 31 and 37 are of the same approximate value, the signal 41 will be of opposite sign and substantially equal in magnitude to the process measurement signal 16 which was present during the momentary closure of the switch means 32. Alteration of the relative values of the resistors 31 and 37 can be used for scaling of the signal 41 as required or as appropriate under the particular circumstances of any given application. Since the closure of the switch means 32 is timed by the programmer 14 to occur immediately prior to the time at which the process measurement signal 16 is updated with a new process measurement signal 16 appearing immediately after the switch means 32 is reopened, the process measurement signal 16 will be representative of the most recent measurement performed by the measuring device 13 and the signal 41 will be representative of the inverted value of the process measurement signal 16 during the immediately preceding interval.

The process measurement signal 16 is applied through a resistor 43 and the signal 41 is applied through a resistor 44 to a common point to produce a simulated derivative signal 22 which, when the resistors 43 and 44 are equal, is representative of the value of the process measurement signal 16 added to the value of the signal 41. Since the signal 41 is substantially equal to the inverted previous process measurement signal, the simulated derivative signal 22 is representative of the present process measurement signal 16 minus the immediately preceding process measurement signal 16. As with resistors 31 and 37, the relative values of resistors 43 and 44 can be altered to achieve various signal scaling objectives required for a particular installation.

The process measurement signal 16 is applied through a resistor 51 to the inverting input of an operational amplifier 53. In a similar manner the simulated derivative signal 22 is applied through a variable resistor 52 to the same inverting input of the operational amplifier 53. The noninverting input of the amplifier 53 is connected to ground and the output of the amplifier 53 is connected through a resistor 54 and a variable calibration resistor 55 to the inverting input thereof.

The controller input signal 26 produced at the output of the operational amplifier 53 is therefore of the form $$Y = -[X_2 + K(X_2 - X_1)]$$

where $Y$ = control input signal 26,
$X_1$ = signal 41,
$X_2$ = process measurement signal 16, and
$K$ = a constant, where resistors 51 and 54 are of equal value. The value of the constant $K$ in the above equation is determined by the relationship between the value of the resistor 51 and the value of the variable resistor 52. If the variable resistor 52 is set at a value equal to the value of the resistor 51, the control input signal 26 will comprise approximately equal proportional and derivative components. As the value of the resistor 52 is decreased the derivative action imparted to the signal 26 is increased whereas increasing the value of the resistor 52 will decrease the amount of derivative effect provided to the process controller 27 by the controller input signal 26.

In a preferred embodiment of the circuit of FIG. 3, resistors 31 and 37 are of approximately equal value, resistors 43 and 44 are of approximately equal value, resistors 51 and 54 are of approximately equal value, and resistor 52 is variable from zero resistance to a resistance equal to approximately ten times the resistance of resistor 51. Using such values, signal 41 is equal to $-X_1$, the simulated derivative signal 22 is equal to $X_2 - X_1$, and the signal at the inverting input of the operational amplifier 53 is equal to $$X_2 + K(X_2 - X_1)$$

where $X_1$, $X_2$, and $K$ are as previously defined.

A particularly preferred circuit of the type illustrated by FIG. 3 is a circuit in which the following components are used:

| | |
|---|---|
| Operational amplifier 35 | Model CA 3131 RCA Somerville, N. J. |
| Operational amplifier 53 | Model 741 Fairchild Camera and Instrument Mt. View, California |
| Resistors 31 and 37 | 100 K ohms |
| Resistors 43, 44, 51, and 54 | 50 K ohms |
| Variable resistor 52 | 0–500 K ohms |
| Variable resistor 55 | 0–10 K ohms |
| Capacitor 36 | 0.5 microfarad |
| Switch 32 | Model AWCB-16411 D414 normally open mercury wetted relay Adams and Westlake Elkhart, Indiana |

Such a particularly preferred circuit has been successfully used to impart derivative action to the process measurement signal 16 from an absolute vapor pressure analyzer to produce a process control signal 29 suitable for controlling the flow of steam to a furfural stripping column.

Figure 4:
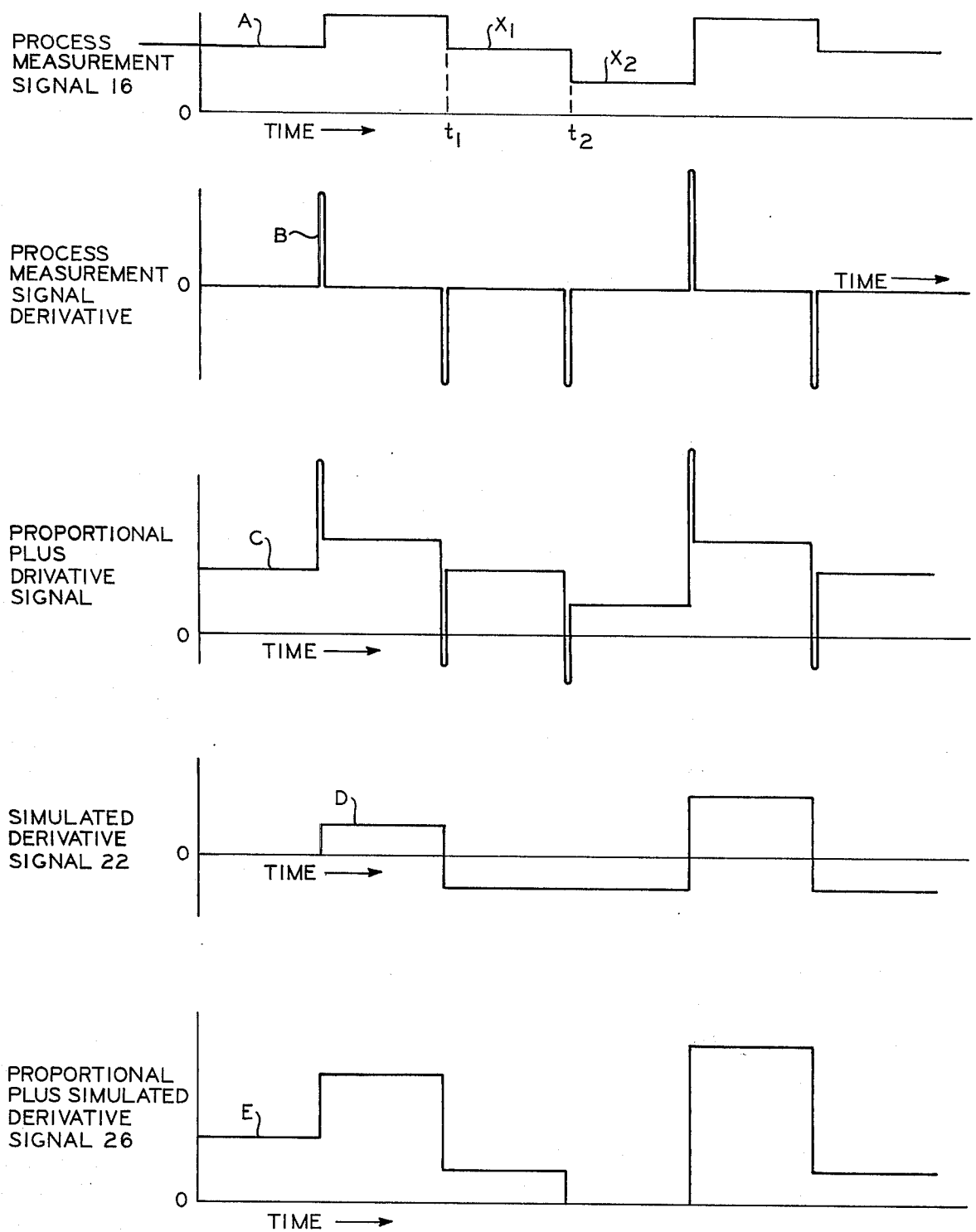
FIG. 4 is a graphic illustration of a comparison between the response of a conventional process controller and the response of the process controller of the invention to a process signal which is incrementally altered at periodic intervals.

FIG. 4 illustrates graphically the differences between conventional derivative and proportional-plus-derivative signals and analogous signals generated utilizing the apparatus and method of the invention. The process measurement signal 16 appearing as curve A of FIG. 4 is a simplified typical signal which is incrementally altered at periodic intervals. The time derivative B of such a process measurement signal is illustrated immediately below the process measurement signal 16 and, as illustrated, consists of a series of spikes each being theoretically infinite in height and having no width but being limited in height by the limitations of the circuit from which they are produced and having a small width due, in a similar manner, to the practical limitations of the differentiating circuit or device. The illustrated process measurement signal derivative is typical of the derivative signal which would be produced by the derivative response portion of a conventional process controller. Combining the process measurement signal 16 of the process measurement signal derivative with proportional and derivative constants both equal to 1 will yield the proportional plus derivative signal C illustrated. With such a proportional plus derivative signal, the derivative portion of the signal has no effect during the portion of the interval during which the process measurement signal 16 remains constant and the derivative effect at the moment of process measurement signal change from one value to the next is not suitable for use in most control systems and will, in fact, cause disruption of many systems. The combined proportional plus derivative signal C is therefore nothing more than a proportional signal with a very narrow spike of considerable amplitude superimposed each time the value of the proportional signal changes.

In contrast to the process measurement signal derivative B illustrated, the simulated derivative signal 22 illustrated as curve D of FIG. 4 is maintained at a constant value throughout each interval of the process measurement signal 16 with the simulated derivative signal being responsive to the magnitude and direction of the difference between the present process measurement signal value and the immediately preceding process measurement signal value. Thus, when the simulated derivative signal 22 is added to the process measurement signal 16 to provide a proportional plus simulated derivative signal 26 such as the signal E illustrated using proportional and simulated derivative constants equal to 1, the resulting signal 26 includes a derivative function which does not contain objectionable spikes and which incorporates a component providing effective derivative action in the resulting control signal when the signal 26 is used as the input to a proportional or proportional-integral controller.

The derivative action created by the invention establishes a derivative of a periodic process measurement signal on a periodic basis rather than an instantaneous basis as conventional controllers tend to do. In accordance with the invention, the derivative action is accomplished by taking a finite amount of time and determining the magnitude and direction of the change over that amount of time. The simulated derivative signal is therefore generally equal to $$K' \frac{X_2 - X_1}{t_2 - t_1}$$

where $X_1$ and $X_2$ are as previously defined;
$t_1$ = time at which the interval during which the process measurement signal 16 is $X_1$ begins:
$t_2$ = time at which the interval during which the process measurement signal 16 is $X_2$ begins; and
$K'$ = a constant.
This relationship among $X_1$, $X_2$, $t_1$ and $t_2$ is illustrated by two adjacent intervals on curve A of FIG. 4. The resultant value can then be used to extrapolate or predict the future value of signal 16 based on the present or immediately preceding rate of change.

When the measuring device 13 is operated to update the process measurement signal 16 at equal periodic intervals of time, the expression $(t_2 - t_1)$ is a constant value so that a new constant $K$ can be defined as $$\frac{K'}{t_2 - t_1}$$

thereby making the simulated derivative signal equal to $$K(X_2 - X_1)$$

where $X_1$, $X_2$, and $K$ are as previously defined.

It can be seen that the invention can be readily adopted by those skilled in the art to incorporate a timing mechanism which would alter the constant $K$ when operation in accordance with the method and apparatus of the invention is desired in conjunction with a process measurement signal which is incrementally altered at time intervals of varying length.

The preferred control system configuration illustrated by FIG. 2 permits the use of a wide variety of conventional control systems including electrical analog, digital electronic, pneumatic, hydraulic, mechanical, or combinations thereof which are compatible with an appropriate derivative simulator means for use in comparing the control input signal 26 with a set point signal 28 and producing a process control signal 29 in response thereto. Although this particular control system configuration is preferred due to the commercial advantages of simply inserting the preferred circuit of FIG. 3 between the measuring device and the controller in order to transform the conventional control system of FIG. 1 to the control system of the invention illustrated by FIG. 2, those skilled in the art are also capable of incorporating the method and apparatus of the invention directly into a process controller to replace the conventional derivative action of a controller such as the process controller 17 of FIG. 1 with the derivative simulator of the invention.

In addition, the derivative simulator 21 of the invention and the preferred circuit illustrated by FIG. 4 can be utilized wherever a derivative of an incrementally varying signal is desired. In addition, other variations and modifications of the method and apparatus of the invention can be accomplished by those skilled in the art within the scope of the invention and of the appended claims thereto.

What is claimed is:

1. A method for controlling a process in response to a process signal which is incrementally altered at successive time intervals, said method comprising:
   maintaining a first signal representative of the value of said process signal during the present interval;
   maintaining a second signal representative of the value of said process signal during the immediately preceding interval;
   generating, in response to said first signal and said second signal, a simulated derivative signal responsive to the magnitude and direction of the difference between said first signal and said second signal;
   generating a third signal by combining said first signal and said simulated derivative signal to produce said third signal;
   utilizing said third signal as an input to a process control means; and
   controlling said process in response to an output of said process control means.

2. A method in accordance with claim 1 wherein generating said simulated derivative signal comprises subtracting said second signal from said first signal.

3. A method in accordance with claim 1 wherein maintaining said second signal comprises:
   updating the content of a signal maintenance means immediately prior to the end of each said periodic interval by entering said first signal in said signal maintenance means; and
   maintaining the content of said signal maintenance means at a constant value immediately prior to the end of the succeeding interval.

4. A method in accordance with claim 1 wherein said process signal is altered at periodic intervals and wherein generating said third signal comprises adding said first signal and said simulated derivative signal to produce said third signal.

5. A method in accordance with claim 4 wherein generating said simulated derivative signal comprises subtracting said second signal from said first signal.

6. A method in accordance with claim 5 wherein said third signal is of the general form $$X_2 + K(X_2 - X_1)$$

where
   $X_2 =$ said first signal,
   $X_1 =$ said second signal, and
   $K =$ a constant.

7. A method in accordance with claim 6 wherein maintaining said second signal comprises:
   updating the content of a signal maintenance means immediately prior to the end of each said periodic interval by entering said first signal in said signal maintenance means; and
   maintaining the content of said signal maintenance means at a constant value until immediately prior to the end of the succeeding periodic interval.

8. A method for generating a process controller input signal in response to a process signal which is incrementally altered at periodic intervals, said method comprising:
   maintaining a first signal representative of the value of said process signal during the present periodic interval;
   maintaining a second signal representative of the value of said process signal during the immediately preceding periodic interval;
   generating, in response to said first signal and said second signal, a simulated derivative signal responsive to the magnitude and direction of the difference between said first signal and said second signal; and
   combining said first signal and said simulated derivative signal to produce said process controller input signal.

9. A method in accordance with claim 8 wherein generating said simulated derivative input signal comprises subtracting said second signal from said first signal.

10. A method in accordance with claim 8 wherein maintaining said second signal comprises:
   updating the content of a signal maintenance means immediately prior to the end of each said periodic interval by entering said first signal in said signal maintenance means; and maintaining the content of said signal maintenance means at a constant value until immediately prior to the end of the succeeding periodic interval.

11. A method in accordance with claim 8 comprising adding said first signal and said simulated derivative signal to produce said process controller signal.

12. A method in accordance with claim 11 wherein generating said simulated derivative signal comprises subtracting said second signal from said first signal.

13. A method in accordance with claim 12 wherein said process controller signal is of the general form $$X_2 + K(X_2 - X_1)$$

where $X_2$ = said first signal,
$X_1$ = said second signal, and
$K$ = a constant.

14. A method in accordance with claim 13 wherein maintaining said second signal comprises:

updating the content of a signal maintenance means immediately prior to the end of each said periodic interval by entering said first signal in said signal maintenance means; and maintaining the content of said signal maintenance means at a constant value until immediately prior to the end of the succeeding periodic interval.

15. Apparatus comprising:

means for producing a process signal responsive to a condition within a process, said process signal being incrementally altered at periodic intervals and being maintained at a constant value for the duration of each periodic interval;

means for generating a retained signal substantially equal to the value of said process signal during the immediately preceding periodic interval;

means for generating a simulated derivative signal in response to a comparison of said process signal and said retained signal;

means for generating a controller input signal by combining said process signal and said simulated derivative signal; and controller means for comparing said controller input signal with a set point signal and delivering a process control signal in response thereto.

16. Apparatus in accordance with claim 15 wherein said means for generating a simulated derivative signal comprises means for subtracting said retained signal from said process signal.

17. Apparatus in accordance with claim 15 wherein said means for generating said retained signal comprises:

signal holding means for producing a retained signal substantially equal to the last signal value applied to an input thereof; and switch means for momentarily applying said process signal to said input of said signal holding means immediately prior to the end of each said periodic interval.

18. Apparatus in accordance with claim 17 wherein said means for generating a controller input signal comprises means for adding said process signal and said simulated derivative signal to produce said controller input signal.

19. Apparatus in accordance with claim 18 wherein said means for generating said simulated derivative signal comprises mean for subtracting said retained signal from said process signal.

20. Apparatus in accordance with claim 19 wherein means for generating said retained signal comprises:

signal holding means for producing a retained signal substantially equal to the last signal value applied to an input thereof; and switch means for momentarily applying said process signal to said input of said signal holding means immediately prior to the end of each said periodic interval.

21. Apparatus comprising:

means for accepting a first signal which is incrementally altered at periodic intervals and generating a retained signal substantially equal to the value of said first signal during the immediately preceding periodic interval;

means for subtracting said retained signal from said first signal to produce a simulated derivative signal; and means for combining said simulated derivative signal with said first signal to produce an output signal.

22. Apparatus in accordance with claim 21 wherein said means for accepting a first signal and generating said retained signal comprises:

signal holding means for producing a retained signal substantially equal to the last value applied to an input thereof; and switch means for momentarily applying said first signal to said input of said signal holding means immediately prior to the end of each said periodic interval.

23. Apparatus in accordance with claim 22 wherein said means for combining said simulated derivative signal with said first signal comprises means for adding said first signal and said simulated derivative signal to produce an output signal.

* * * * *